United States Patent [19]

Gravel

[11] 4,300,813
[45] Nov. 17, 1981

[54] FIBER OPTIC TRANSDUCER AND METHOD OF MANUFACTURE THEREFOR

[75] Inventor: Robert L. Gravel, Stow, Mass.

[73] Assignee: Sperry Corporation, New York, N.Y.

[21] Appl. No.: 71,893

[22] Filed: Sep. 4, 1979

[51] Int. Cl.³ .......................... G02B 5/14; G01L 9/00
[52] U.S. Cl. ..................... 350/96.10; 73/705
[58] Field of Search .............. 350/96.10, 96.20, 96.29; 73/705; 250/227; 356/227

[56] References Cited

U.S. PATENT DOCUMENTS

| | | | |
|---|---|---|---|
| 3,686,958 | 8/1972 | Porter et al. | 73/705 |
| 3,789,667 | 2/1974 | Porter et al. | 73/705 |
| 4,078,432 | 3/1978 | Stewart | 73/705 |
| 4,204,742 | 5/1980 | Johnson | 350/96.29 |

OTHER PUBLICATIONS

Uberbacher, "Cutting Tool for Optical Fiber Ribbon Cable" *IBM Tech Disc. Bull.*, vol. 21, No. 10, Mar. 1979.
Gloge et al., "Optical Fiber end Preparation for low--loss Splices" in *Bell System Tech. Journal*, vol. 52, No. 9, Nov. 1973 pp. 1579-1588.

*Primary Examiner*—Stewart J. Levy
*Attorney, Agent, or Firm*—Howard P. Terry; Seymour Levine

[57] ABSTRACT

An optical transducer for converting pressure variations to variations in amplitude of an optical signal. A first optical transmission line is positioned above a base in a manner to maintain its end face stationary while a second optical transmission line is positioned above the base in a manner to permit the axis to be displaced from the axis of the optical fiber with the stationary end face in accordance with variations of pressure applied thereto. Optical signals propagating in one of the optical transmission lines will couple to the other with a coupling factor dependent upon the axial displacement of the optical fibers. Under conditions of continuous pressure variations, such as that created by an incident acoustic wave, the coupled optical signal will be amplitude modulated in accordance with the pressure variations.

1 Claim, 3 Drawing Figures

FIBER OPTIC TRANSDUCER AND METHOD OF MANUFACTURE THEREFOR

BACKGROUND OF THE INVENTION

1. Field of the Invention

The present invention relates to transducers and, more particularly, to a transducer which converts small displacement into light intensity variations.

2. Description of the Prior Art

Underwater target locating systems may utilize active acoustic devices, which comprise a radiation source and a receiver to detect reflected sound energy, or passive devices which detect sound energy radiated from distant sources. The information obtained with active and passive systems is the same; mainly they determine the relative position of a multiplicity of disbursed discrete targets in a quiescent water ambient. Passive underwater locating systems are generally preferred for military applications. Since target position cannot be determined passively with a single acoustic receiver (hydrophone), a passive system requires a multiplicity of hydrophones, the minimum number to determine the position in one plane being three, one at each position at the vertices of an equiangular triangle. These systems determine the relative position of a target by frequency filtering the target signal received at each sensor from the background noise, determining the relative phases of the filtered signal between sensors, and processing this phase information to obtain the relative range and angle location. Large numbers of hydrophones, 100 and 1000, are typically utilized in a one or two dimensional array to provide sufficient systems signal sensitivity in the presence of noise and to provide a desired angular resolution over a broad acoustic frequency band.

Acoustic transducers of the prior art utilize piezoelectric crystals or ferroelectric ceramics to transform acoustic signals into electrical signals by converting pressure variations into corresponding voltage variations across electrodes positioned on opposite sides of the material. These transducers typically supply very small voltages at very high impedance levels. Generally the transducer is coupled to an amplifier via a long wire or coaxial cable, the capacitance of which is charged by the voltage across the output terminals of the crystal, causing the voltage response, due to a given pressure wave, to be greatly reduced. This reduction in sensitivity may be eliminated by positioning a transimpedance amplifier in close proximity to the transducer which amplifies the signal and transforms the high output impedance of the transducer to a low impedance which is coupled to the input terminals of the transmission line. The transimpedance amplifier eliminates the decreased signal caused by the capacitance of the transmission line, thus permitting the amplified signal to be transmitted with little loss over long lengths of line.

Due to the complexity of hydrophone arrays their costs generally are excessive. Moreover, the large number of electronic components, each having finite failure rates, utilized in the array make it near impossible to maintain all parts of such a complicated system in perfect working order for more than a few hours. In view of the deficiencies of the prior art transducer, efforts have been expended to develop electrically passive acoustic transducer utilizing fiber optic techniques. Fiber optic systems eliminate active components at the transducer, provide higher bandwidth, smaller cable diameter, lower weight, and lower cost. Generally the effort expended on fiber optic transducers has been in the area of single mode fiber interferometric devices. These devices, however, require long live laser sources, single mode, single polarization fibers, and low loss single mode connectors, each of which require advances in the state of the art before practical elements utilizable in a fiber optic transducer system can be developed. Additionally, single mode interferometric systems exhibit relatively high sensitivity to ambient pressure head and temperature variations. Of all the problems that exist in prior art fiber optic sonar transducers, reduction of phase/variations caused by the sensitivity of the single mode fiber to the same pressure head and temperature variations, is the most severe. Ambient phase variations produced in the fiber optic cable may be minimized by increasing the length of the fiber at the transducer. This increase, however, creates more severe pressure head and temperature induced phase variations in the transducer for which compensation requires electrically active feed back control systems. The limitations of single mode interferometric sensor systems are overcome with the present invention by utilizing multimode fibers and devising an intensity modulation technique that is compatible therewith.

SUMMARY OF THE INVENTION

A preferred fiber optic sonar transducer constructed according to the principals of the present invention includes two optical fibers each cut to have end faces that are substantially perpendicular to the axis and positioned with a small gap between the end faces that is in the order of 2–3 microns. One fiber is fixed mounted to maintain its end face stationary while the other is cantilevered to permit displacement of the end face with the application of pressure thereto. When the axes lie on a common straight line light propagating in one fiber will couple with maximum intensity to the other fiber. To obtain maximum pressure sensitivity however the axis of the fibers may be offset to approximately the 50% transmission condition at the static pressure value.

An acousto-optic transducer may be constructed in accordance with the present invention by extending an optical fiber between two mounting structures posited on a base plate, mounting the fiber under tension to orient the axis along a straight line, bonding the fiber to both mounting structures to maintain the axis orientation thereafter, and cutting the fiber near the end of one mounting structure to obtain two fibers, one mounted to maintain its end face stationary the other cantilevered to permit vertical displacement of its end face.

DESCRIPTION OF THE PREFERRED EMBODIMENTS

Figure 1:
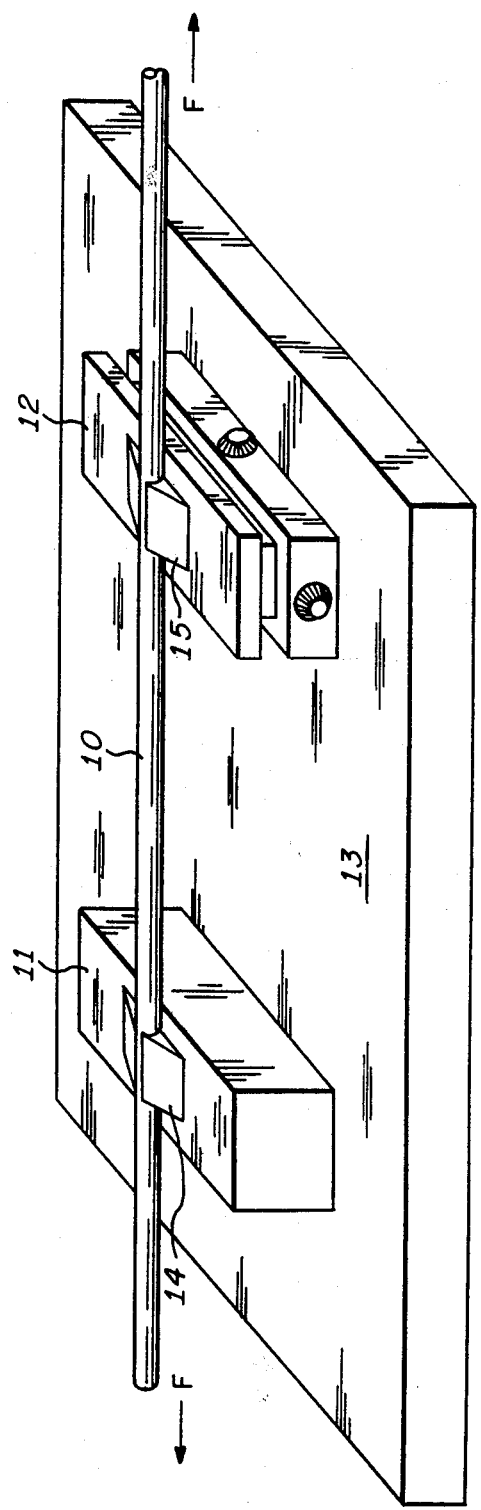
FIG. 1 is an illustration of an optical fiber positioned under tension on two mounting blocks.
Figure 2:
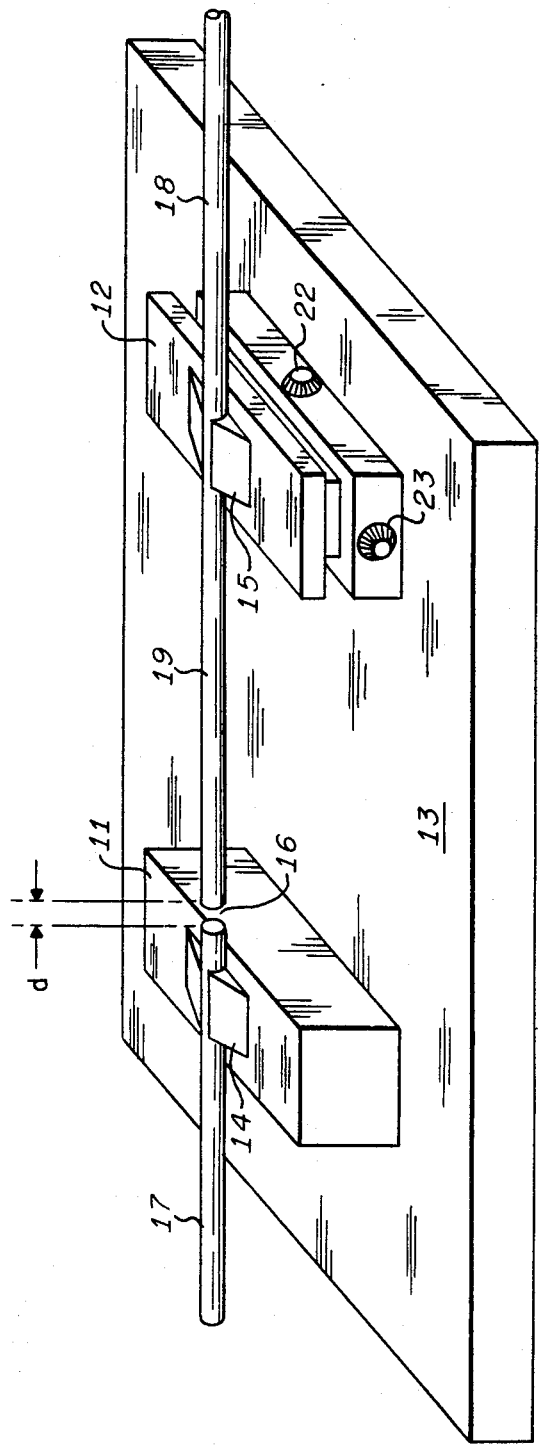
FIG. 2 is an illustration of an embodiment of the invention.

Referring to FIG. 1 an optical fiber 10 is mounted on mounting blocks 11 and 12 above a base plate surface 13 and held under tension by force exerting devices (not shown) coupled to each end thereof. When the desired tension is achieved the fiber 10 is bonded to the mounting blocks 11 and 12 with a permanent bonding epoxy 14 and 15. After the epoxy has cured a scribe break tool is utilized to cleave fiber 10 near one mounting block, as for example mounting block 11, to create a gap 16 which separates the two optical fibers formed thereby by a distance "d" as shown in FIG. 2. This distance "d" is a function of a tension initially applied to the optical fiber 10, the gap increasing with increasing tensional forces. The gap spacing "d" is selected with consideration given to optical coupling and spillover, factors which are functions of the diameter of the core and the numerical aperture of the optical fiber. Typically this spacing is a small fraction of the core diameter. Cleaving the optical fiber 10 in this manner creates an optical fiber 17 with a stationary end face and an optical fiber 18 with a cantilevered section 19 having an end face positionable with the application of pressure to the cantilevered optical fiber section 19.

After cleaving, the axis of the optical fiber 17 and the axis of the cantilevered section 19 may be aligned by positioning the mounting block 12 vertically with the rotation of the vertical adjustment knob 22 and horizontally with the rotation of the horizontal adjustment knob 23 each of which control mechanisms well known in the art. Optical signals propagating in one fiber will couple across the gap 16 to the other. If the axes are aligned to lie on a common straight line maximum signal coupling between the fibers will be realized, being limited only by the spill over which may be determined from the gap spacing "d" and the diameter and the numerical aperture of the optical fibers 17 and 18. When a pressure is applied to the system, the axis of the cantilevered section 19 will be displaced from its initial position thus altering the signal coupling between the optical fibers 17 and 18, the coupling sensitivity being inversely proportional to the diameter of the fibers and the initial relative alignment of the axis. When a pressure variation occurs, such as that caused by an incident acoustic signal, an axial displacement variation is caused and the light signal coupled from one optical fiber to the other will exhibit an aptitude modulation that is representative of the pressure variation. Maximum coupling variation with displacement and consequently maximum pressure sensitivity is achieved when the axes are offset to provide a coupling factor in the order of 50% at the static pressure value. Useful operation however, may be achieved with a coupling in the range between 20% and 90%. Control knobs 22 and 23 may be adjusted to off-set the axis of the cantilevered section 19 from the axis of the optical fiber 17 to achieve this maximum pressure sensitivity and consequently the maximum optical sensitivity of the amplitude modulation of the optical signal coupled between fibers to pressure variations caused by incident acoustic signals.

Figure 3:
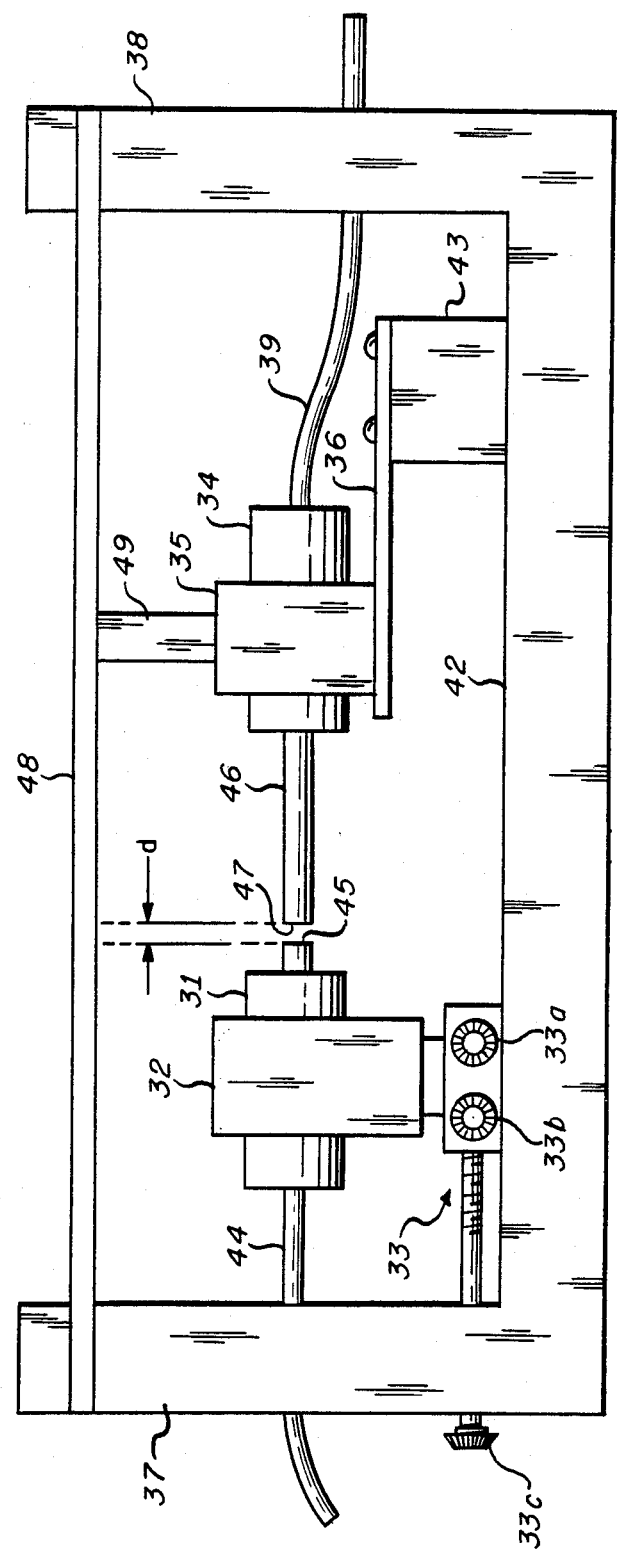
FIG. 3 is a schematic representation of an embodiment of the invention.

FIG. 3 shows another embodiment of the invention which may be utilized to achieve an amplitude modulation of optical signals which is representative of an incident acoustic wave. An optical fiber 44 may be extended through a ferrule 31, which is secured in a holder 32 mounted on a vertical and horizontal positioning block 33 and bonded therein. A second optical fiber 39 may be inserted in a second ferrule 34 through a cantilevered extension 46 thereof and bonded therein. The ends of the ferrules may then be polished to obtain fiber end faces 45 and 47 which are substantially perpendicular with the axis of the fiber contained therein. Ferrule 34 may be secured in a holder 35 which in turn may be mounted on a spring 36. The fibers 39 and 44 may be extended through the wall 37 and 38 of a housing and a positioning block 33 may be movably mounted on a base 42 of the housing with the spring 36 extending a given height above the base 42 from a stationary mounting block 43. Ferrule 31 may be positioned by rotating a horizontal adjusting knob 33a, a vertical adjusting knob 33b, and a longitudinal position adjusting knob 33C, each of which control mechanisms well known in the art, to provide the desired axial relationship and spacing "d" between the end faces 45 and 47. Holder 35 may be coupled to a diaphram 48, mounted on the walls 37 and 38, via a plunger 49. Acoustic signals incident the diaphram 48 cause vibrations thereof which are transmitted to the end face 47 via the cantilevered extension 46 of the ferrule 34, the holder 35, and the plunger 49. An optical signal propagating in either of the optical fibers 44 or 46 will couple to the other fiber in the manner previously described, causing an optical signal with amplitude modulation representative of the acoustic signal incident to the diaphram 48 to propagate in the coupled fiber.

While the invention has been described in its preferred embodiments, it is to be understood that the words that have been used are words of description rather than of limitation and that changes within the purview of the appended claims may be made without departing from the true scope and spirit of the invention in its broader aspects.

I claim:

1. An optical transducer comprising:

first means for mounting optical transmission lines;

a first optical transmission line having a first longitudinal axis and a first end face oriented substantially perpendicularly to said first longitudinal axis, said first optical transmission line secured to said first mounting means such that said first end face is fixedly positioned;

second means for mounting optical transmission lines;

a second optical transmission line having a second longitudinal axis and a second end face oriented substantially perpendicularly to said second longitudinal axis, said second optical transmission line secured to said second mounting means such that a section thereof extends for a predetermined distance to position said second end face longitudinally a predetermined short distance from said first end face, said second end face being displaceable from an initial position;

spring means for positioning said second mounting means; and pressure sensitive means responsive to applied pressure and coupled to flex said spring means such that under a predetermined ambient pressure level said first and second longitudinal axes are transversely offset to establish an ambient optical energy coupling factor between said first and second optical transmission lines in a range between substantially 20% and 90% and such that said second end face is displaced distances corresponding to pressure differentials from said predetermined ambient pressure whereby applied pressures are transformed into displacements of said second end face thus causing a variation in said energy coupling factor between said first and second optical transmission lines that is representative of said applied pressures.

* * * * *